United States Patent [19]

Pelz et al.

[11] Patent Number: 4,978,170
[45] Date of Patent: Dec. 18, 1990

[54] SEAT WITH ADJUSTABLE BACK AND ARM RESTS

[75] Inventors: Herbert Pelz, Remscheid; Bernd Klüting, Radevormwald; Heinz-Jürgen Wagener, Remscheid; Hans-Joachim Berghof, Remscheid-Hasten, all of Fed. Rep. of Germany

[73] Assignee: Keiper Recaro GmbH & Kg, Remscheid, Fed. Rep. of Germany

[21] Appl. No.: 343,488

[22] Filed: Apr. 25, 1989

[30] Foreign Application Priority Data

Apr. 30, 1988 [DE] Fed. Rep. of Germany ....... 3814758

[51] Int. Cl.$^5$ ................................................ A47C 7/54
[52] U.S. Cl. ..................................... 297/411; 297/417
[58] Field of Search ............... 297/411, 417, 378, 381, 297/359, 362, 355

[56] References Cited

U.S. PATENT DOCUMENTS

| | | | |
|---|---|---|---|
| 1,291,413 | 1/1919 | Cluff, Jr. .......................... | 297/417 X |
| 4,165,901 | 8/1979 | Swenson et al. ................... | 297/417 |
| 4,400,033 | 8/1983 | Pietsch .............................. | 297/417 |

FOREIGN PATENT DOCUMENTS

| | | | |
|---|---|---|---|
| 141941 | 8/1983 | Japan ................................. | 297/417 |
| 746313 | 3/1956 | United Kingdom ................ | 297/417 |

Primary Examiner—Laurie K. Cranmer
Attorney, Agent, or Firm—Peter K. Kontler

[57] ABSTRACT

A seat for use in a motor vehicle has a body supporting unit and a back rest which is pivotably connected to the body supporting unit by two hinges having pintles provided with eccentrics which cause the back rest to perform a composite pivotal and transverse movement while it changes its orientation with reference to the body supporting unit. The back rest carries two pivotably mounted arm rests which are connected to the back rest and to the body supporting unit by linkages serving to ensure that the orientation of the arm rests remains substantially or completely unchanged while the back rest is pivoted with reference to the body supporting unit. A second linkage can be used to pivot the front ends of the arm rests rearwardly and upwardly when the back rest is lifted with reference to the body supporting unit and is pivoted forwardly toward the dashboard in a two-door motor vehicle in order to afford convenient access to the rear seats or to permit a passenger to leave a rear seat with a minimum of effort.

17 Claims, 5 Drawing Sheets

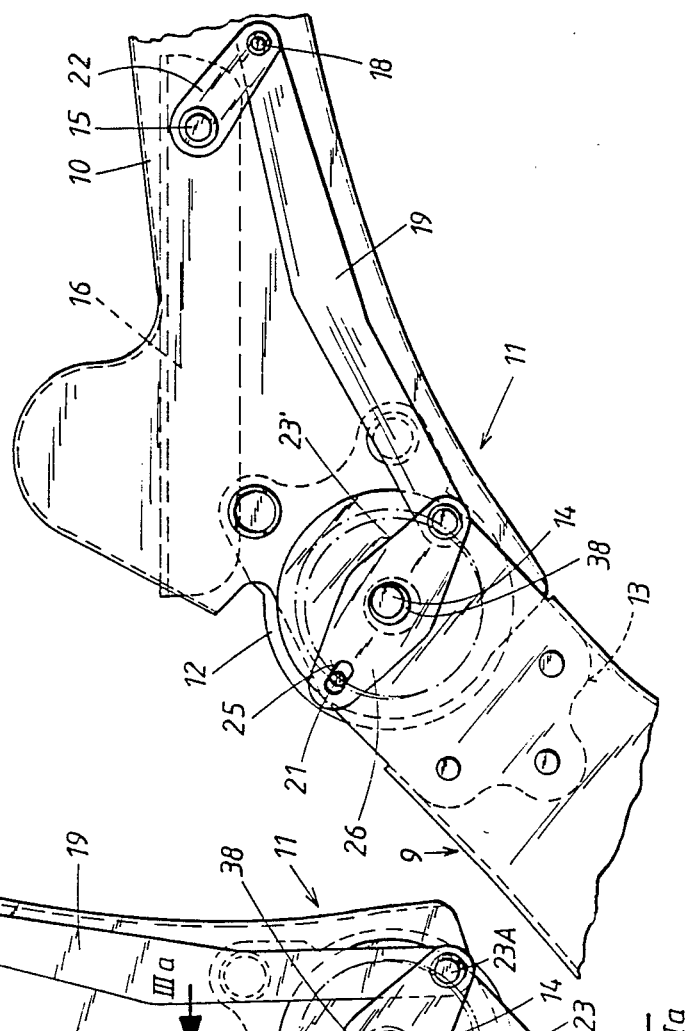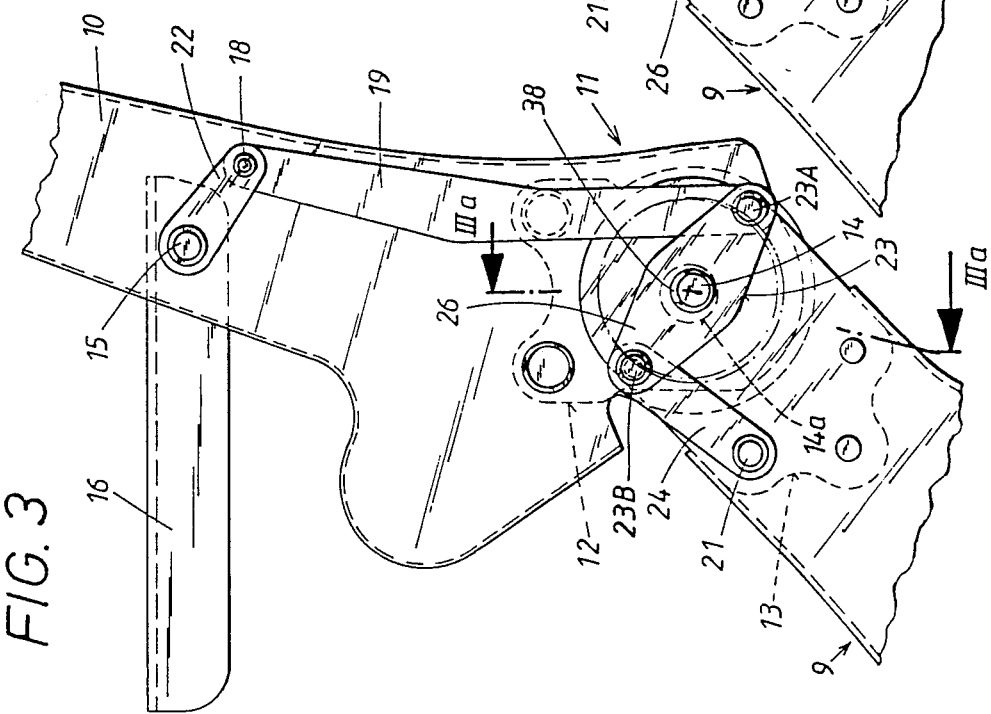

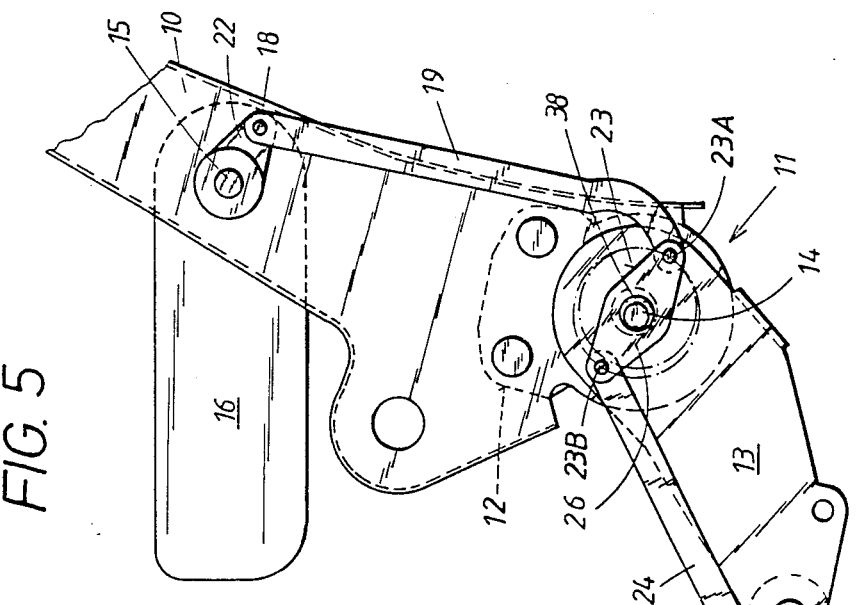
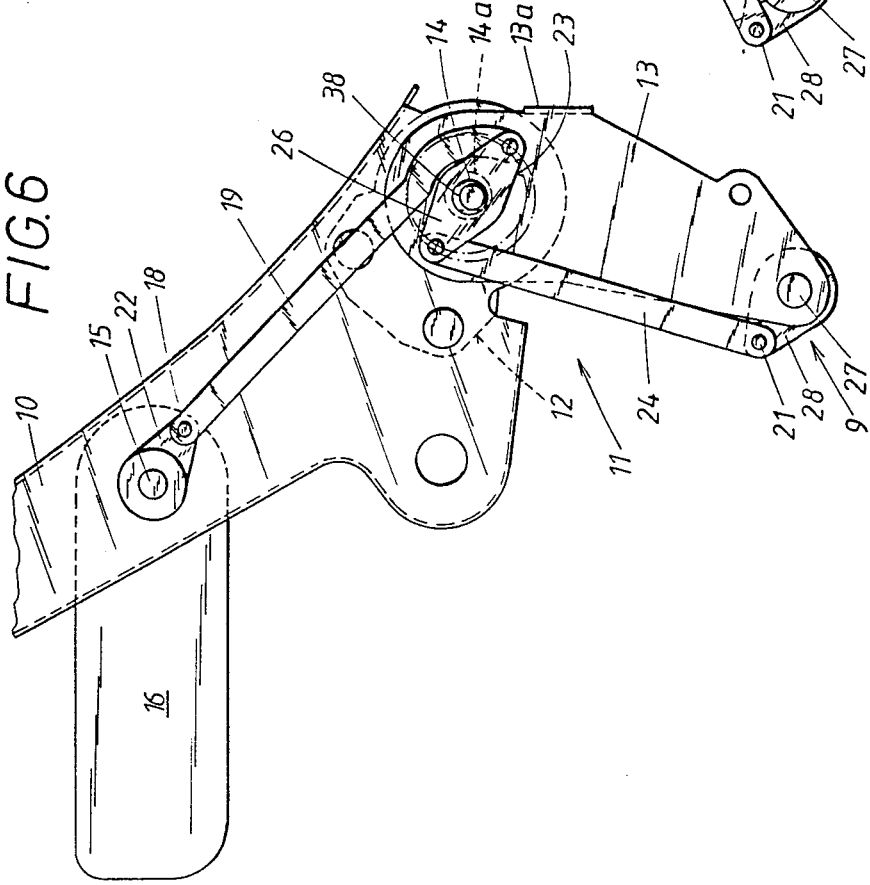

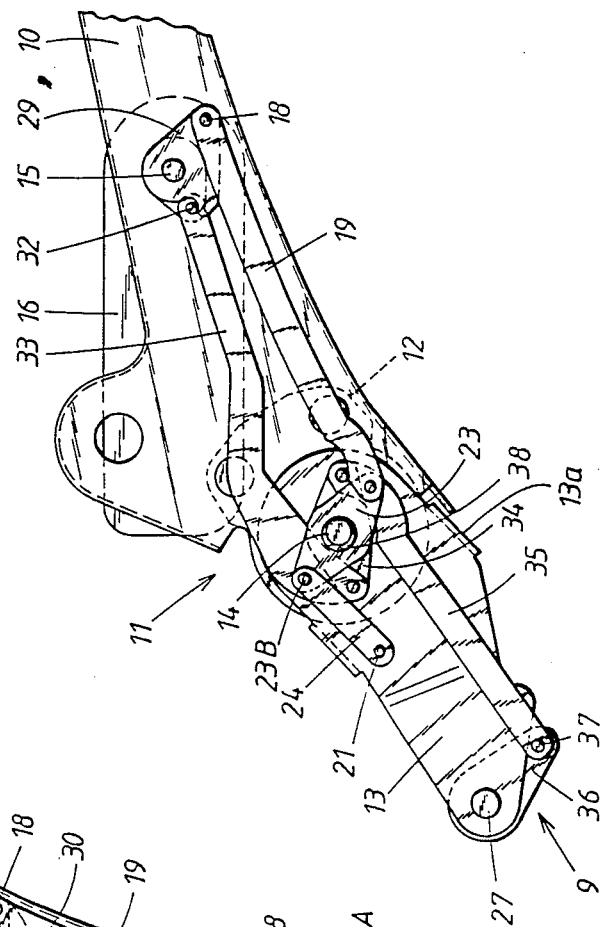
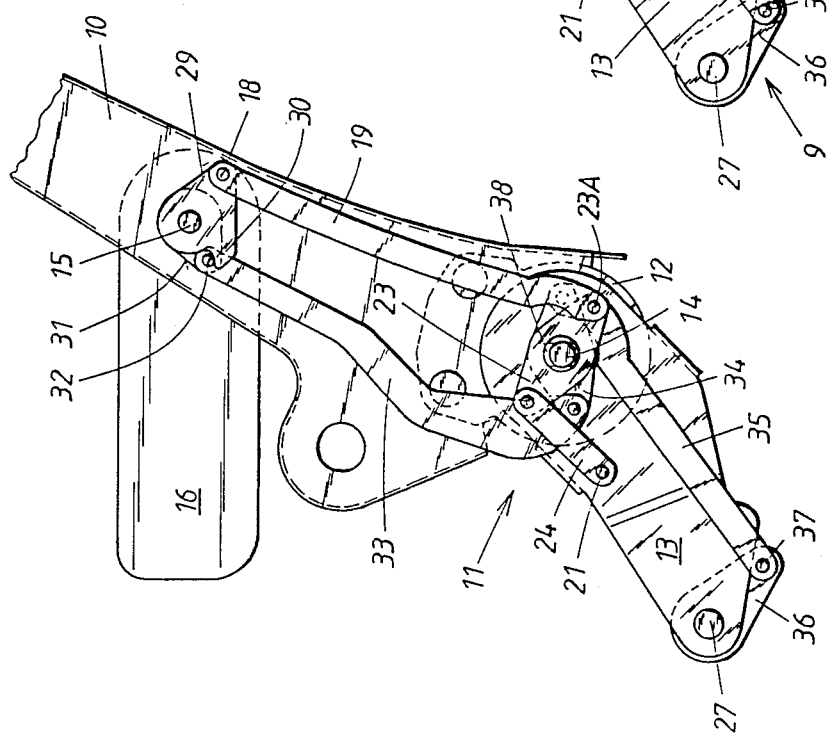
FIG. 7
FIG. 8

SEAT WITH ADJUSTABLE BACK AND ARM RESTS

BACKGROUND OF THE INVENTION

The invention relates to sealing facilities in general, and more particularly to improvements in seats which can be used with advantage in motor vehicles. Still more particularly, the invention relates to improvements in seats with adjustable back rests which are connected with or adjacent to arm rests.

German Pat. No. 26 48 951 to Göldner et al. discloses a seat which is intended for use in motor vehicles and wherein the rear portion of the frame which forms part of the body supporting unit of the seat carries two plates flanking the frame and each pivotably supporting the respective frame member of the back rest. The means for pivotably mounting the back rest on the body supporting unit includes two hinges having a common axis and each connecting one of the plates to the adjacent frame member of the back rest. Each frame member of the back rest carries an arm rest which is pivotably secured to the respective frame member at a level above the common axis of the hinges. A link connects each arm rest to the body supporting unit of the seat. The purpose of the links is to prevent excessive changes of orientation of the arm rests in response to adjustments of inclination of the back rest relative to the body supporting unit of the seat. A cylinder and piston assembly is provided to change the inclination of the back rest.

A drawback of the patented seat is that the position of the back rest (and hence the position of each arm rest) is not sufficiently stable. For example, the inclination of the back rest can change in response to leakage of pressurized fluid from the cylinder and piston assembly, and this can result in a movement of the arm rests to positions which are not comfortable to the occupant of the seat. Therefore, many recent types of seats for motor vehicles are equipped with gear transmissions which are associated with or embodied into the hinges and ensure reliable retention of the back rest in a desired position of inclination with reference to the body supporting unit.

Another drawback of the patented seat is that the inclination of the back rest relative to the body supporting unit can be changed only within a relatively small angle. This is attributable to the fact that the frame members of the back rest extend downwardly beyond the respective hinges and their lower end portions are connected to the cylinder and piston assembly.

OBJECTS OF THE INVENTION

An object of the invention is to provide a seat, particularly a seat for use in motor vehicles, with novel and improved means or ensuring that the orientation of the arm rests changes little or not at all, even if the inclination of the back rest relative to the body supporting unit of the seat is adjustable by means of gear transmissions which are associated with or embodied into the hinges for the back rest.

Another object of the invention is to provide the seat with simple, compact and inexpensive means for preventing any, or for preventing excessive, changes of orientation of the arm rests even if the back rest is designed to change its inclination within a large angle.

A further object of the invention is to provide a seat wherein the arm rests can remain in optimum positions relative to the back rest even if the back rest of the seat is caused to move between different levels, e.g., in order to enable a passenger to readily reach a back seat in a two-door motor vehicle.

An additional object of the invention is to provide novel and improved means for connecting the arm rests to the back rest and to the body supporting unit of a seat, particularly in a motor vehicle.

Still another object of the invention is to provide novel and improved hinges for use in the above outlined seat.

SUMMARY OF THE INVENTION

The invention is embodied in a seat, particularly in an adjustable seat for use in motor vehicles. The improved seat comprises a body supporting first component, a second component including or constituting a back rest, at least one hinge including a pintle which connects the second component to the first component for pivotal movement about a substantially horizontal first axis, at least one arm rest, and means for articulately connecting the arm rest to the first and second components so that the orientation of the arm rest remains at least substantially unchanged when the second component is pivoted about the first axis. The connecting means comprises first pivot means connecting the arm rest to the second component for pivotal movement about a second axis, a linkage (this term is intended to embrace one or more links, levers and/or analogous parts), second pivot means connecting the linkage to the back rest for pivotal movement about a third axis, and third pivot means directly or indirectly connecting the linkage to the first component for pivotal movement about a fourth axis which is parallel to the other axes.

The second pivot means is spaced apart from the first pivot means, and the hinge further comprises a first leaf which is rigid or integral with the first component (or which can constitute the first component) and a second leaf which is rigid or integral with the second component. The third pivot means can be secured to the first leaf or directly to the first component.

The hinge can further comprise means for moving one of the components (particularly the second component) transversely of the first axis in response to pivoting of the second component about the first axis. The moving means can include at least one eccentric on the pintle of the hinge. The eccentric can constitute an integral part of the pintle or is rigidly secured thereto.

In accordance with one presently preferred embodiment, the linkage includes a second eccentric which is non-rotatably connected with the pintle, a first link which is connected to the second pivot means, and a second link which is mounted on the second eccentric and is articulately connected to the first link. The eccentricity of one of the eccentrics (particularly of the second eccentric) is less than (preferably 50 percent of) the eccentricity of the other eccentric. The direction of throw of the second eccentric preferably coincides with the direction of throw of the other eccentric. The linkage can further comprise a third link which is articulately connected to the second link and is mounted on the third pivot means. Alternatively, the second link can have a slot for the third pivot means.

In accordance with another presently preferred embodiment, the seat further comprises fourth pivot means which connects the first leaf of the hinge to the first component for pivotal movement about a fifth axis which is parallel to the other axes. Means can be provided to releasably lock the first leaf in a predetermined angular position with reference to the first component. The latter can comprise an arm, and the fourth pivot means is or can be rigidly secured to such arm.

In accordance with still another presently preferred embodiment, the linkage comprises a first link which is mounted on the first pivot means, a second link which is connected to the first link by the second pivot means, and at least one additional link which is mounted on the third pivot means and is articulately connected with the second link. In addition to the aforementioned fourth pivot means between the first leaf of the hinge and the first component, such seat further comprises means for tilting the arm rest relative to the back rest in response to pivoting of the first leaf about the fifth axis from a first to a second position to thereby change the orientation of the arm rest. The tilting means can comprise a stop which is provided on the first link, a follower which is provided on the arm rest and abuts the stop in the first position of the first leaf, a lever which is pivotally mounted on the pintle and has a first arm and a second arm, a first connecting member (e.g., an elongated rod or link) which is articulately connected to one arm of the lever and to the follower, and a second connecting member (e.g., a rod or a link) which is articulately connected to the other arm of the lever and to the first component. The stop is engaged by the follower in the first position but is spaced apart from the follower in the second position of the first leaf. The first link can be mounted for pivotal movement about the second axis, and the tilting means can further comprise a second lever which is rigid with the follower and with the arm rest. The follower can form an integral part of the second lever. The first pivot member can be rotatably journalled in the second component and can be rigid with the arm rest as well as with the second lever.

The first link of the linkage can be pivotable with respect to the arm rest and is connected to the second link by the second pivot means. The first pivot means of such seat can be rotatably journalled in the second component and can be rigid with the second lever and with the arm rest.

The novel features which are considered as characteristic of the invention are set forth in particular in the appended claims. The improved adjustable seat itself, however, both as to its construction and the mode of adjusting the same, together with additional features and advantages thereof, will be best understood upon perusal of the following detailed description of certain specific embodiments with reference to the accompanying drawing.

BRIEF DESCRIPTION OF THE DRAWING

FIG. 3 is a fragmentary side elevational view of a second seat wherein different linkages are employed to connect the arm rests with the first and second components, the back rest being shown in a substantially upright position;

FIG. 4 shows a portion of a seat constituting a slight modification of the seat which is shown in FIGS. 3 and 3a;

FIG. 5 is a fragmentary side elevational view of a third seat wherein the first leaf of each hinge is pivotable with reference to the first component, the back rest being shown in a substantially upright position;

FIG. 6 shows the structure of FIG. 5 but with the back rest in a forwardly inclined position;

FIG. 7 is a fragmentary side elevational view of a fourth seat which constitutes a modification of the seat of FIGS. 5 and 6;

FIG. 8 illustrates the structure of FIG. 7 but with the back rest in a rearwardly inclined position.

DESCRIPTION OF PREFERRED EMBODIMENTS

Figure 2:
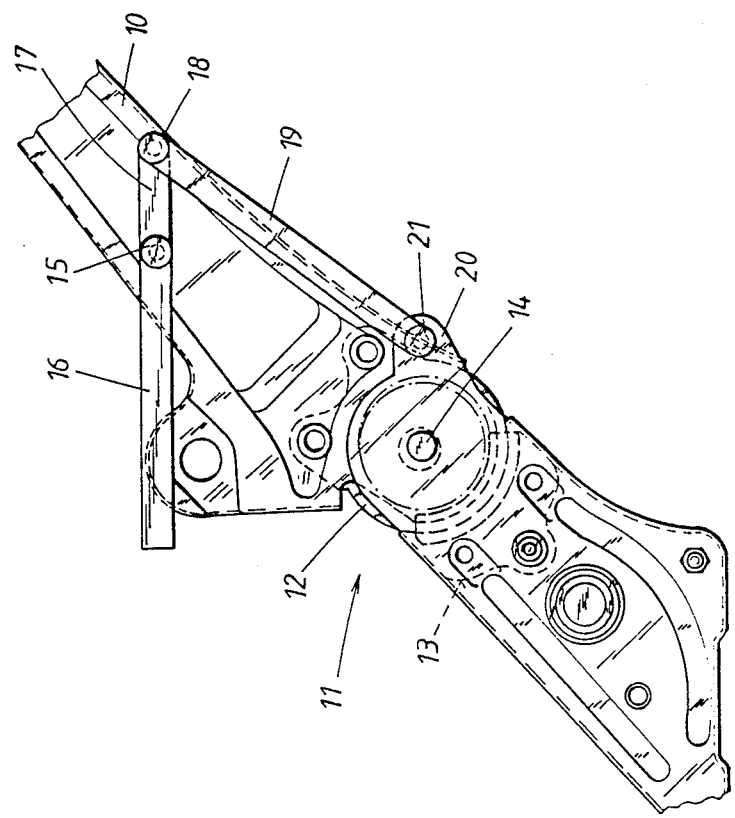
FIG. 2 shows the structure of FIG. 1 but with the back rest in a rearwardly inclined position in which the arm rests are more closely adjacent the first component of the seat.
Figure 1:
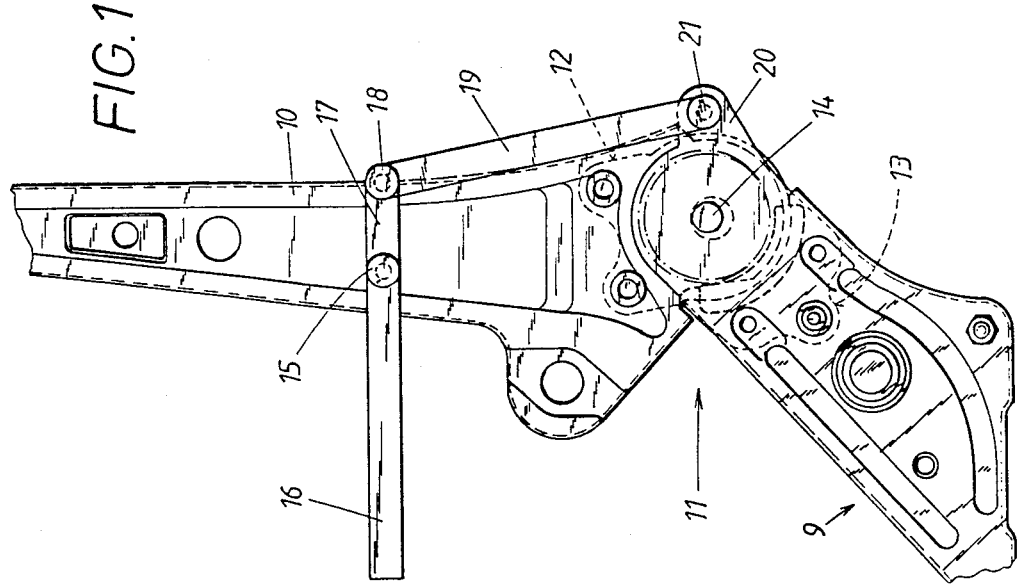
FIG. 1 is a fragmentary elevational view of a seat which embodies one form of the invention and wherein the first leaf of each hinge is rigidly secured to or forms an integral part of the first component, the back rest being shown in an upright position.

FIGS. 1 and 2 show a portion of a seat which is designed for use in motor vehicles and comprises a first component 9 constituting a body supporting unit which is or can be movably or fixedly secured to the frame of the motor vehicle. The first component 9 is connected with a second component 10 (which is the back or back rest of the seat) by two hinges 11 (only one shown). One hinge 11 is disposed at each side of the seat, and each hinge comprises a horizontal pintle 14 and two leaves 13, 12 which are connected to each other by the pintle 14 for angular movement of the leaf 12 about a horizontal axis. The illustrated pintle 14 is coaxial with the pintle at the other side of the component 9.

The hinge 11 may be of the type known as wobble-type hinge fully disclosed, for example, in published German patent application No. 1 297 496, in German Pat. No. 1 680 128, in commonly owned U.S. Pat. No. 4,563,039 and in numerous other granted United States patents and pending patent applications of the assignee of the present application.

The leaf 13 can be integral with or it may be separably connected to the component 9; in either event, it can be considered as part of this component. Analogously, the leaf 12 can be integral with or it may be permanently or separably secured to the back rest 10. The means for changing the inclination of the back rest 10 relative to the component 9 by pivoting the leaf 12 about the axis of the pintle 14 includes a hand wheel (e.g., of the type shown in FIG. 2 of U.S. Pat. No. 4,563,039) and/or a motor. A discrete hand wheel can be provided for each pintle 14.

Each pintle 14 comprises at least one integral or separately produced eccentric (note the eccentric 14a in FIG. 3a) and one or more centric (non-eccentric) portions. The eccentric or eccentrics 14a are mounted within the leaf 12 and the centric portion or portions are mounted within the leaf 13, or vice versa. This ensures that the leaf 12 and the back rest 10 move transversely of the common axis of the pintles 14 while the back rest 10 is pivoted about such axis. One of the leaves 12, 13 has an internal gear and the other leaf has a spur gear which mates with the internal gear and has m−n teeth (m being the number of teeth on the internal gear and n being a whole number including one). The reasons for such gear transmissions between the leaves 12, 13 of the hinges 11 are the same as disclosed in the aforementioned commonly owned U.S. Pat. No. 4,563,039. The inner diameter of the internal gear exceeds the maximum diameter of the spur gear by a value matching or exceeding the height of a tooth.

The back rest 10 supports two arm rests 16 (only one shown in FIGS. 1 and 2) which are installed at the respective sides of the back rest and are secured thereto by pivot members 15 each defining an axis which is parallel to the common axis of the pintles 14. The pivot members 15 (e.g., in the form of rivets or bolts and nuts) are disposed at a level above the pintles 14 and can be secured to the component 10 or to the respective leaves 12.

Each pivot member 15 forms part of a means for articulately connecting the respective arm rest 16 to the back rest 10 and to the component 9 in such a way that the orientation of the arm rests remains at least substantially unchanged irrespective of selected inclination of the back rest 10 with reference to the component (body supporting unit) 9. As a rule, the arm rest 16 is substantially horizontal and substantially parallel to the body supporting component 9. The connecting means for the illustrated arm rest 16 further comprises a second pivot member 18 which is connected to the rearwardly projecting extension 17 of the arm rest 16 (namely to the arm rest portion which extends rearwardly beyond the pivot member 15), a simple linkage which (in the embodiment of FIGS. 1 and 2) includes a single elongated link 19 having an upper end portion articulately connected to the back rest 16 by the pivot member 18, and a third pivot member 21 which articulately connects the lower end portion of the link 19 to a rearwardly extending projection or lug 20 of the leaf 13 or of the component 9. The axes of the pivot members 18, 21 are parallel to the axis of the pivot member 15 and to the common axis of the pintles 14.

The parts 9, 10, 16–17, 19, 14, 15, 18 and 21 form a parallel motion mechanism with four pivot axes one of which is defined by the pintles 14 and the other three of which are defined by the pivot members 15, 18 and 21. The back rest 10 and the link 19 define the two longer sides of the parallelogram, and the extension 17 and component 9 (inclusive of the leaf 13 and lug 20) define the two shorter sides of the parallelogram. The just described mechanism ensures that the orientation of the back rest 16 does not change at all, or does not change to any appreciable extent, in response to or as a result of pivoting of the back rest 10 about the common axis of the pintles 14.

The seat which is shown in FIGS. 1 and 2 does not compensate for the aforediscussed lateral or transverse movements of the leaf 12 and back rest 10 while the back rest is caused to change its inclination with reference to the component 9. Such transverse movements are induced by the eccentric or eccentrics 14a. Since the transverse movements of the leaf 12 and back rest 10 are not very pronounced, the orientation of the arm rest 16 in response to pivoting of the back rest about the common axis of the pintles 14 is negligible or acceptable, at least in certain types of vehicles. Seats which can compensate for transverse movements of the back rest 10 so that the orientation of the arm rests 16 is changed less than in the seat of FIGS. 1 to 2, or is not changed at all, are shown in FIGS. 3 to 9. Changes of orientation of the arm rests 16 in the seat of FIGS. 1 and 2 involve a slight upward or downward movement of the free front end portion of each arm rest in response to pivoting of the back rest 10 about the common axis of the pintles 14.

Figure 3A:
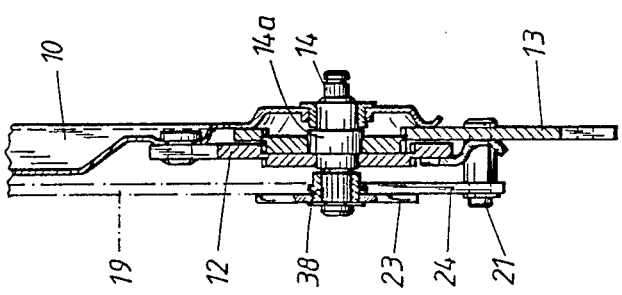
FIG. 3a is a fragmentary sectional view substantially as seen in the direction of arrows from the line IIIa—IIIa of FIG. 3.

FIGS. 3 and 3a show a portion of a second seat with an adjustable back rest 10 which is secured to the first component (body supporting unit) 9 by means of two hinges 11 each having a pintle 14 and two leaves 12, 13. The illustrated leaf 12 is integral with or is connected to the respective side of the back rest 10, and the illustrated leaf 13 is integral with or is connected to the component 9. Each pintle 14 has an eccentric 14a which is surrounded by a spur gear of the leaf 13, and a centric portion which is surrounded by the leaf 12. The leaf 12 has an internal gear which mates with the spur gear of the leaf 13. The numbers of teeth on the diameters of the two gears are selected in a manner as disclosed in connection with the embodiment of FIGS. 1–2 and as fully described in commonly owned U.S. Pat. No. 4,563,039.

Each pintle 14 further carries a second eccentric 38 which is non-rotatably connected thereto (e.g., in that the respective portion of the pintle 14 as axially parallel external teeth extending into complementary axially parallel tooth spaces of the eccentric 38). The eccentricity of the second eccentric 38 is half the eccentricity of the eccentric 14a, and the direction of throw of the eccentric 38 is the same as that of the eccentric 14a. This can be seen in FIG. 3 wherein the eccentric 14a is indicated by a broken-line circle. In other words, that point at the periphery of the eccentric 38 which is remotest from the axis of the pintle 14 is located on a line which also includes the axis of the pintle and that point at the periphery of the eccentric 14a which is remotest from such axis.

The means for connecting the arm rests 16 to the respective sides of the back rest 10 and to the component 9 comprises first pivot members 15 for the corresponding arm rest, and linkages each of which includes a first link 22 rigid with the respective pivot member 15 (which, in turn, is rigid with the respective arm rest 16), an elongated second link 19 which has an upper end articulately connected to the rear end of the first link 22 by a pivot member 18, a third link 23 in the form of a two-armed lever 23 which is turnably mounted on the eccentric 38 of the respective pintle 14 and has a first arm articulately connected to the lower end portion of the link 19 by a pivot member 23A, and a fourth link 24 which is articulately connected to the component 9 (e.g., by way of the respective leaf 13) by a pivot member 21. Another pivot member 23B connects the upper end portion of the link 24 with the left-hand arm 26 of the link or lever 23. The pivot member 15 (which is rigid with the arm rest 16 and with the respective link 22) is rotatably journalled in the back rest 10.

The seat which is shown in FIG. 4 constitutes a modification of the seat of FIGS. 3 and 3a. Thus, the link 24 of FIG. 3 is omitted and the left-hand arm 26 of the modified lever or link 23' of the seat shown in FIG. 4 has an elongated slot 25 for the pivot member 21 on the component 9.

In each of the seats which are shown in FIGS. 3–3a and 4, transverse movements of the back rest 10 are compensated for by the modified connecting means for the arm rests 16 in such a way that the orientation of the arm rests remains completely unchanged or changes less than in the embodiment of FIGS. 1–2 when the back rest 10 is pivoted with reference to the component 9 about the axis of the respective pair of pintles 14. Full or practically full compensation for the transverse movements of the back rest 10 in response to pivoting relative to the component 9 can be achieved if the distance of the axis of the pivot member 23A on the link 23 or 23' from the common axis of the pintles 14 equals the distance of the axis of the pivot member 21 from the axis of the pivot member 23B (FIG. 3) or pivot member 21 (FIG. 4). In addition, the eccentricity of the eccentric 38 should be half the eccentricity of the eccentric 14a. These prerequisites for preventing changes of orientation of the arm rests 16 in response to pivoting of the respective back rests 10 can be readily satisfied in the seats of FIGS. 3–3a and 4.

FIGS. 5 and 6 show a portion of a fourth seat wherein the leaf 13 of each hinge 11 is articulately connected to the respective lateral frame member of the component 9 (body supporting unit) of the seat by a pivot member 27 which is affixed to a short arm 28 of the component 9. The leaf 13 can be pivoted between the positions which are shown in FIGS. 5 and 6. When pivoted to the position of FIG. 6, the leaf 13 maintains the back rest 10 at a higher level and, if the back rest 10 is then pivoted to the forwardly inclined position of FIG. 6, it provides more room for a passenger who wishes to reach the rear seat in the passenger compartment of a two-door sedan or another motor vehicle.

The illustrated leaf 13 has a bent-over portion 13a forming part of a device which releasably locks the hinge 11 at the lower of the two levels (as shown in FIG. 5). The locking device can further comprise a pawl or an analogous part (now shown) which can be caused to releasably engage and hold the portion 13a in order to maintain the leaf 13 in the angular position of FIG. 5. The leaf 13 assumes such position when the seat of FIGS. 5 and 6 is ready to be used by the driver or by a passenger in a motor vehicle.

The means for connecting the illustrated arm rest 16 to the respective side of the back rest 10 for the purpose of ensuring that the arm rest 16 retains its orientation during pivoting of the leaf 13 about the axis of the pivot member 27 and during pivoting of the back rest 10 about the axes of the pintles 14 comprises a modified linkage having four links 22, 19, 23 and 24. The links 22, 19 and 23 are mounted in the same way as the similarly referenced links of the seat which is shown in FIGS. 3 and 3a. The lower end portion of the link 21 is connected to the arm 28 of the component 9 by a pivot member 21. The axes of the pivot members 15, 18, 23A, 23B and 21 are parallel to the axis of the pivot member 27 and to the common axis of the pintles 14. The pivot member 27 can be non-rotatably connected to the component 9 and/or its arm 28 and rotatably or pivotably supports the lower end portion of the leaf 13. The axis of the pivot member 21 is located slightly forwardly of and at a level slightly above the axis of the pivot member 27. The dimensions of the eccentrics 14a and 38 on each pintle 14 are the same as described in connection with the seat of FIGS. 3 and 3a. The same applies for other parameters including the direction of throw of each eccentric. The link 22 is preferably rigid with the pivot member 15 which, in turn, is rigid with the arm rest 16 but is rotatably journalled in the respective side of the back rest 10.

Figure 9:
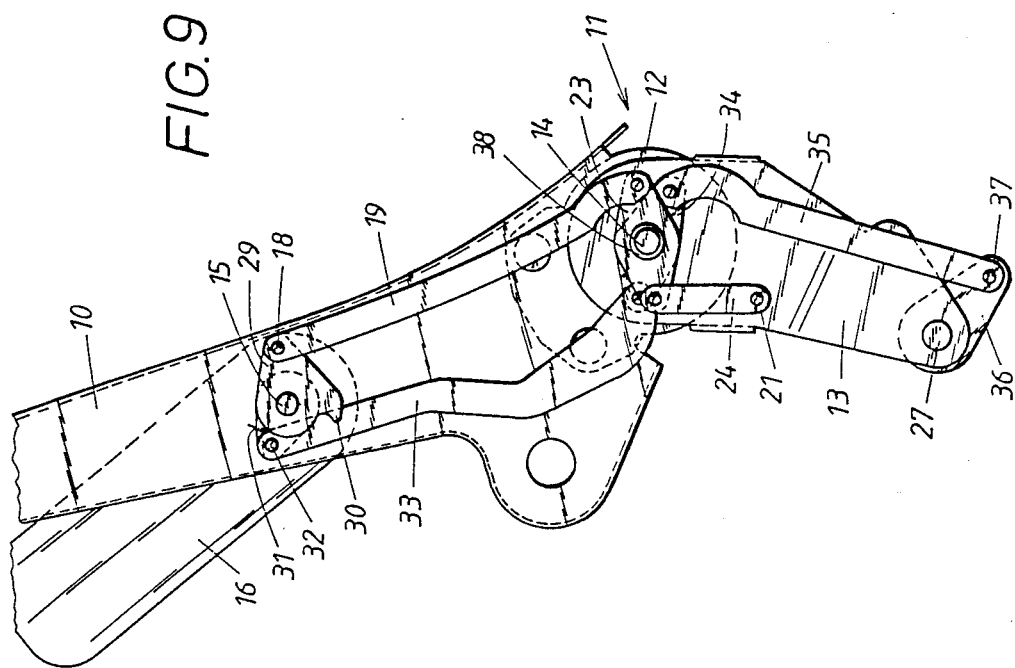
FIG. 9 is shows the structure of FIG. 7 but with the back rest in a forwardly inclined position and the front ends of the arm rests tilted upwardly.

The seat which is shown in FIGS. 7 to 9 departs from the seat of FIGS. 5 and 6 in that it further comprises means for turning the arm rests 16 (one shown) (i.e., for changing the orientation of the arm rests) in response to pivoting of the leaves 13 to their substantially upright positions and in response to pivoting of the back rest 10 to its forward or foremost position (such positions of one of the arm rests 16 and of the back rest 10 are shown in FIG. 9). FIGS. 7 and 8 show that the orientation of the illustrated arm rest 16 does not change when the back rest 10 is pivoted with reference to the leaf 13 and component 9 including the arm 36 (corresponding substantially to the arm 28 of the seat shown in FIGS. 5 and 6). The means for connecting the arm rest 16 to the back rest 10 in such a way that the orientation of the arm rest does not change in response to pivoting of the back rest 10 about the common axis of the pintles 14 is similar to the connecting means of FIGS. 3 and 3a. It comprises a link 29 which is rotatable on the pivot member 15 (the latter is rotatable in the back rest 10 but is rigid with the arm rest 16), a link 19 which is connected to the link 29 by a pivot member 18, a two-armed lever or link 23 on the eccentric 38 of the pintle 14 which is shown in FIGS. 7 to 9, a link 24 which is connected to a pivot member 21 on the leaf 13, a pivot member 23A which articulately connects the lower end portion of the link 19 to the right-hand arm of the link 23, and a pivot member 23B which articulately connects the upper end of the link 24 to the left-hand arm of the link 23.

The aforementioned titling means serves to pivot the illustrated arm rest 16 in a clockwise direction in response to pivoting of the leaf 13 about the axis of the pivot member 27 from the angular position of FIGS. 7-8 to the angular position of FIG. 9. The tilting means comprises a second linkage and a number of pivot members for the links of the second linkage. In addition, the tilting means includes a stop 30 in the form of a forwardly projecting protuberance on the link 29 slightly forwardly of and at a level beneath the pivot member 15, and a follower pin 32 at one end of a first link or lever 31 of the second linkage. The link 31 is rigid with the pivot member 15 which, in turn, is rotatably journalled in the back rest 10 but is rigid with the arm rest 16.

The follower pin 32 of the link 31 abuts the stop 30 in the rearwardly inclined position of the leaf 13 (FIGS. 7 and 8). This follower pin 32 further serves as a pivot member which articulately connects the link 31 to the upper end portion of an elongated second link (connecting member) 33 of the second linkage. The lower end portion of the link 33 is articulately connected to the left-hand arm of a third link 34. The right-hand arm of the link 34 is articulately connected to the upper end portion of a fourth link (connecting member) 35, and the lower end portion of the link 35 is articulately connected to the arm 36 of the component 9 by a pivot member 37. The axes of all pivot members are parallel to the common axis of the pintles 14. The link 34 is rotatably mounted on the respective pintle 14. The pivot member 37 is located at a level slightly below and rearwardly of the pivot member 27 for the leaf 13.

When the user of the seat or another person decides to pivot the back rest 10 between or even beyond the positions which are shown in FIGS. 7 and 8 (i.e., when the leaf 12 is caused to pivot about the axis of the respective pintle 14), the linkage including the links 29, 19, 23 and 24 ensures that the orientation of the arm rest 16 remains at least substantially unchanged. The stop 30 continues to abut the follower pin 32, and its level with reference to the axis of the pivot member 15 remains unchanged so that the follower pin 32 induces the link 31 to maintain the arm rest 16 in a substantially horizontal position.

If the user or another person decides to detach the non-illustrated pallet from the bent-over portion 13a of the leaf 13 and to pivot this leaf from the position of FIGS. 7 or 8 to the position of FIG. 9, the linkage of the pivoting means automatically pivots the arm rest 16 in a clockwise direction about the axis of the pivot member 15 so that the free end of the arm rest moves nearer to the back rest 10 and enables the latter to move forwardly (to or even beyond the position of FIG. 9) so that the thus lifted and pivoted back rest 10 affords more convenient access to the rear portion of the passenger compartment in a two-door motor vehicle. The orientation of the link 29 (which is turnable about the pivot member 15) with reference to the back rest 10 remains unchanged while the leaf 13 is pivoted about the axis of the pivot member 27. However, the link (connecting member) 35 then pivots the link 34 in a clockwise direction so that the link (connecting member) 33 pivots the arm rest 16 about the axis of the pivot member 15 whereby the free forward end of the arm rest moves upwardly and rearwardly, i.e., toward the back rest 10. The arm rest 16 is automatically returned to the substantially horizontal position of FIGS. 7 or 8 when the leaf 13 is pivoted clockwise to leave the substantially upright position of FIG. 9. When pivoted to the angular position of FIG. 9, the arm rest 16 cannot strike the dashboard, the steering wheel, a knob or a like part on the dashboard, a bracket or another rearwardly projecting part in front of the back rest 10. This enables the back rest 10 to move much close to the windshield and to the dashboard than in a seat which does not have any means for automatically pivoting the free ends of the arm rests upwardly and rearwardly when the back rest is to be moved (or while the back rest is being moved) to a position nearer to the dashboard as a result of pivoting of the leaves 13 about the axes of the respective pivot members 27 to positions corresponding to that of the leaf 13 which is shown in FIG. 9.

An advantage which is shared by all illustrated embodiments of the improved seat is that the orientation of the arm rests 16 changes little or not at all even when the means for connecting the back rest 10 to the component 9 includes hinges of the type shown in FIG. 3a, i.e., which cause the back rest to perform a composite movement including a pivotal movement about the common axis of the pintles 14 as well as a movement transversely of such common axis. The embodiment of FIGS. 7 to 9 renders it possible to contribute to the comfort of a passenger who is to enter or to leave the rear portion of the compartment in a two-door motor vehicle.

The improved adjustable seat can be modified in a number of additional ways. For example, the sleevelike eccentric 38 can constitute an integral part of the respective pintle 14.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A seat, particularly for use in motor vehicles, comprising a body supporting first component; a second component including a back rest; at least one hinge including a pintle connecting said second component to said first component for pivotal movement about a substantially horizontal first axis, and means for moving one of said components transversely of said first axis in response to pivoting of said second component about said first axis, said moving means including at least one eccentric on said pintle; at least one arm rest; and means for articulately connecting said arm rest to said components so that the orientation of said arm rest remains at least substantially unchanged when said second component is pivoted about said axis, said connecting means comprising first pivot means connecting said arm rest to said second component for pivotal movement about a second axis, a linkage, second pivot means connecting said linkage to said back rest for pivotal movement about a third axis, and third pivot means connecting said linkage to said first component for pivotal movement about a fourth axis, said second and third and fourth axes being at least substantially parallel to said first axis.

2. The seat of claim 1, wherein said second pivot means is spaced apart from said first pivot means, said hinge further including a first leaf on said first component and a second leaf on said second component, said third pivot means being secured to said first leaf.

3. The seat of claim 1, wherein said eccentric is rigid with said pintle, said linkage including a second eccentric rigid with said pintle, a first link connected to said second pivot means and a second link mounted on said second eccentric and articulately connected to said first link.

4. The seat of claim 3, wherein the eccentricity of one of said eccentrics is less than the eccentricity of the other of said eccentrics.

5. The seat of claim 4, wherein the eccentricity of said second eccentric is half the eccentricity of the other of said eccentrics.

6. The seat of claim 5, wherein the direction of throw of said second eccentric coincides with the direction of throw of said other eccentric.

7. The seat of claim 3, wherein said linkage further includes a third link articulately connected with said second link and mounted on said third pivot means.

8. The seat of claim 3, wherein said second link has a slot for said third pivot means.

9. The seat of claim 1, wherein said linkage includes a first link which is rigid with said arm rest and a second link which is connected to said first link by said second pivot means.

10. The seat of claim 9, wherein said first pivot means is rotatably journalled in said second component and is rigid with said first link and said arm rest.

11. A seat, particularly for use in motor vehicles, comprising a body supporting first component; a second component including a back rest; at least one hinge including a pintle connecting said second component to said first component for pivotal movement about a substantially horizontal first axis, a first leaf and a second leaf, said second leaf being secured to said second component and being pivotal with reference to said first leaf about said first axis; means for articulately connecting said arm rest to said components so that the orientation of said arm rests remains at least substantially unchanged when said second component is pivoted about said first axis, said connecting means comprising first pivot means connecting said arm rest to said second component for pivotal movement about a second axis, a linkage, second pivot means connecting said linkage to said back rest for pivotal movement about a third axis, and third pivot means connecting said linkage to said first component for pivotal movement about a fourth axis, said second and third and fourth axes being at least substantially parallel to said first axis; and fourth pivot means connecting said first leaf to said first component for pivotal movement about a fifth axis which is at least substantially parallel to said first axis.

12. The seat of claim 11, further comprising means for releasably locking said first leaf in a predetermined angular position with reference to said first component.

13. The seat of claim 11, wherein said first component includes an arm and said fourth pivot means is rigidly secured to said arm.

14. The seat of claim 11, wherein said linkage comprises a first link mounted on said first pivot means, a second link connected with said first link by said second pivot means, and at least one additional link mounted on said third pivot means and articulately connected with said second link, and further comprising means for tilting said arm rest relative to said back rest in response to pivoting of said first leaf about said fifth axis from a first to a second position to thereby change the orientation of said arm rest.

15. The seat of claim 14, wherein said tilting means includes a stop provided on said first link, a follower provided on said arm rest and abutting said stop in the first position of said first leaf, a lever pivotably mounted on said pintle and having a first arm and a second arm, a first connecting member articulately connected to one of said arms and to said follower, and a second connecting member articulately connected to the other of said arms and to said first component, said stop being remote from said follower in the second position of said first leaf.

16. The seat of claim 15, wherein said first link is pivotable with reference to said second component about said second axis, said tilting means further comprising a second lever rigid with said follower and said arm rest.

17. The seat of claim 16, wherein said first pivot member is rotatably journalled in said second component and is rigid with said arm rest and with said second lever.

* * * * *